F. I. FERENCZY.
SURFACE TREATING MACHINE.
APPLICATION FILED APR. 27, 1911.
1,022,836.
Patented Apr. 9, 1912.
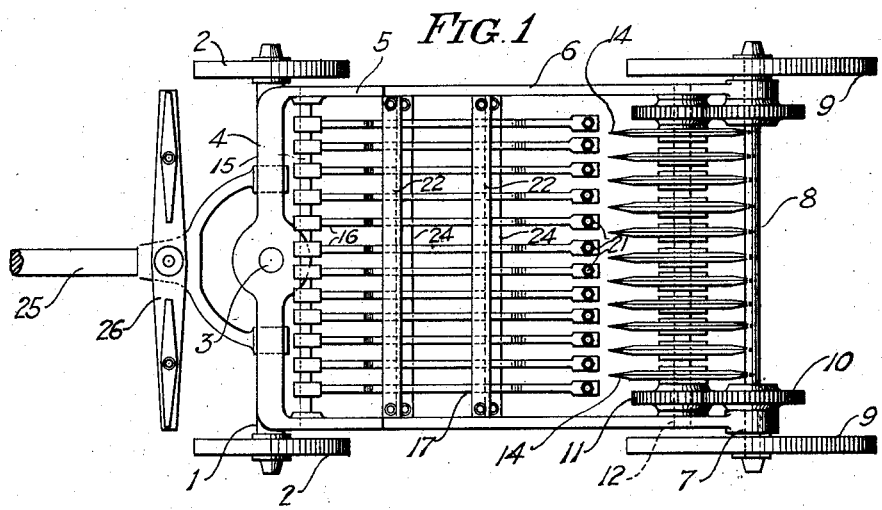
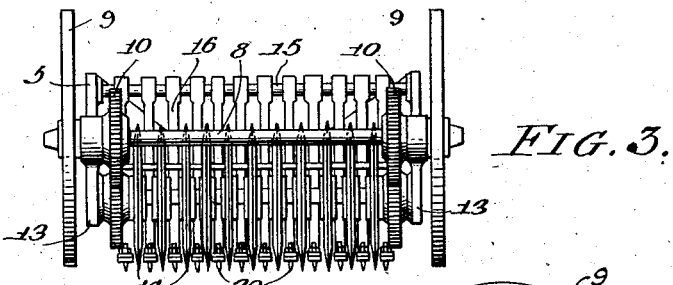
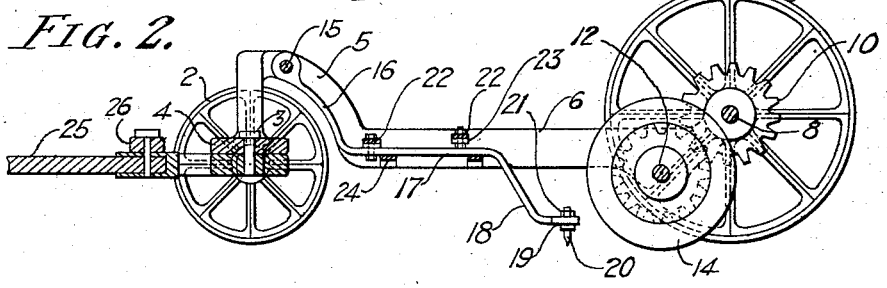
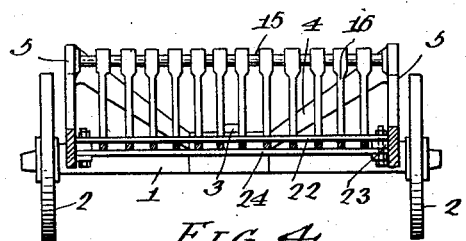
WITNESSES:
INVENTOR.
F. I. FERENCZY
BY
ATTORNEYS
COLUMBIA PLANOGRAPH CO., WASHINGTON, D. C.

UNITED STATES PATENT OFFICE.

FRANK I. FERENCZY, OF WAUSEON, OHIO.

SURFACE-TREATING MACHINE.

1,022,836.  Specification of Letters Patent.  Patented Apr. 9, 1912.

Application filed April 27, 1911. Serial No. 623,703.

*To all whom it may concern:*

Be it known that I, FRANK I. FERENCZY, a subject of the King of Hungary, residing at Wauseon, in the county of Fulton and State of Ohio, have invented certain new and useful Improvements in Surface-Treating Machines, of which the following is a specification, reference being had therein to the accompanying drawing.

This invention relates to surface treating machines and has for its primary object the provision of novel means for disintegrating, raking or roughing the surface of a road, pavement or the like, the machine being designed somewhat along the lines of a harrow and may also be used for tilling the soil.

A further object of the invention is to provide a machine of the above type that is simple in construction, capable of withstanding rough usage, and highly efficient for the purposes for which it is intended.

The above objects are attained by a mechanical construction that will be hereinafter specifically described and then claimed, and reference will now be had to the drawings, wherein:—

Figure 1 is a plan of the machine. Fig. 2 is a longitudinal sectional view of the same. Fig. 3 is a rear elevation of the machine, and Fig. 4 is a cross sectional view of the machine.

A machine in accordance with this invention comprises a truck embodying a front axle 1 and front wheels 2. Pivotally mounted upon the axle 1 by a king bolt 3 is a bolster 4 having the ends thereof curved upwardly to support the forward curved ends 5 of a longitudinal frame 6, said frame having the rear ends thereof provided with bearings 7. Journaled in the bearings 7 is a shaft 8, constituting the rear axle of the truck, and mounted upon the ends of the shaft 8 are rear wheels 9. The shaft 8 at the inner sides of the bearings 7 is provided with fixed gear wheels 10 meshing with gear wheels 11 mounted upon a shaft 12, journaled in bearings 13, carried by the longitudinal frame 6. Upon the shaft 12 is mounted a plurality of equally spaced disks 14 adapted to cut and disintegrate the surface over which the machine travels.

Connecting the forward curved ends of the frame 6 is a transverse rod 15 and pivotally mounted upon said rod are the forward curved ends 16 of a plurality of longitudinal arms 17, said arms being arranged in parallelism and preferably made of resilient material. The arms have the rear ends thereof bent downwardly, as at 18 and provided with apertured heads 19. Detachably mounted in the heads 19 are teeth or tines 20 retained in said heads by nuts 21. These teeth or tines engage in the surface over which the machine travels and assists the disks 14 in disintegrating the surface.

The upward movement of the arms 17 is limited by transverse upper bars 22 mounted upon lugs 23, carried by the inner sides of the frame 6. The downward movement of the arms is limited by lower bars 24 arranged between the side bars of the frame 6 similar to the bars 22, the bars 24 normally supporting the arms 17. The machine can be moved by hand or any suitable power and as an instance, the axle 1 is provided with a tongue 25 and a doubletree 26 whereby a team of horses can be hitched to the same.

The machine can be used for marking and scoring pavements made of concrete or other plastic material.

What I claim is:—

1. A machine of the type described, comprising a front axle, wheels supporting the ends of said axle, a bolster pivotally mounted upon said axle, a rearwardly extending frame carried by said bolster, a shaft journaled in the rear end of said frame, rear wheels mounted upon the ends of said shaft, a shaft revolubly mounted in said frame, disks mounted on said shaft, means for imparting rotary movement to said shaft as the first mentioned shaft is rotated, a rod mounted in said frame near the forward end thereof, rearwardly extending arms carried by said rod, and depending teeth carried by the rear ends of said arms.

2. A machine of the type described, comprising a front axle, wheels supporting the ends of said axle, a bolster pivotally mounted on said axle, a rearwardly extending frame carried by the bolster, a shaft journaled in the rear end of said frame, rear wheels mounted upon the ends of said shaft, a second shaft revolubly supported by said frame, disks mounted on said second shaft, means for imparting rotary movement to said second shaft as the first mentioned shaft is rotated, a rod carried by said frame near its forward end, rearwardly extending arms carried by said rod, depending teeth carried by the free ends of said arms, and upper and lower transverse bars for limiting the movement of said arms.

In testimony whereof I affix my signature in the presence of two witnesses.

FRANK I. FERENCZY.

Witnesses:
R. B. DARBY,
GEORGE HOVEEN.

Copies of this patent may be obtained for five cents each, by addressing the "Commissioner of Patents, Washington, D. C."